United States Patent Office

2,874,031
Patented Feb. 17, 1959

2,874,031

CONVERSION OF HYDROGEN IODIDE TO IODINE

Charles R. Greene, Berkeley, and Shelton E. Steinle, Richmond Annex, Calif., assignors to Shell Development Company, New York, N. Y., a corporation of Delaware No Drawing. Application November 19, 1956
Serial No. 622,771

13 Claims. (Cl. 23—216)

This invention relates to a process for recovering elemental iodine from hydrogen iodide. More particularly, this invention relates to a process for oxidizing hydrogen iodide to iodine, employing molecular oxygen as the oxidizing agent.

According to the art, hydrogen iodide is oxidized to iodine by molecular oxygen, the reaction occurring in either vapor or liquid phase. We have investigated the oxidation of hydrogen iodide by molecular oxygen in the aqueous liquid phase, and have found that the oxidation goes forward at but a very slow rate, even at moderately elevated temperatures and with the use of substantial partial pressures of molecular oxygen. We also have found that both the rate and the extent of the oxidation can be substantially increased by conducting the reaction in the presence of a substantial concentration of hydrogen ion. However, we also have found that the number of strong acids which are practically useful in furnishing the hydrogen ion for the oxidation of hydrogen iodide by molecular oxygen in the aqueous liquid phase are quite limited. Thus, our coworkers have found that of the common strong mineral acids, only phosphoric acid is suitable as the catalyst. For example, sulfuric acid has been found to be too unstable in mixtures of hydrogen iodide, iodine and water, hydrochloric acid has been found to be too volatile for practical use—a separate recovery system for the hydrogen chloride in the effluent gases from the oxidation reaction zone would be required. Nitric acid also is unstable and other strong mineral acids, such as perchloric acid, hydrobromic acid and the like are too expensive for use as the catalyst on a practical economic basis. Boric acid, while stable and non-volatile, is not a sufficiently strong acid to furnish the hydrogen ion concentration essential to the catalysis of the reaction of hydrogen iodide with molecular oxygen at practical rates. Our coworker, Gino Pierotti, discloses the use of phosphoric acid as the catalyst for the reaction of hydrogen iodide with molecular oxygen in his copending application Serial No. 601,570, filed August 1, 1956.

We have investigated the strong organic acids, and have found that of this class of acids, only the alkane sulfonic acids are practically useful for catalyzing the oxidation of hydrogen iodide by molecular oxygen, other organic acids being unstable, too volatile and/or too expensive for the intended use. We also have discovered that the alkane sulfonic acids can be used for catalyzing the oxidation of hydrogen iodide by molecular oxygen in either the aqueous liquid phase or the vapor phase.

Our discoveries thus provide basis for a practical process for the conversion of hydrogen iodide to iodine. Briefly, this process in its broad aspect comprises intimately contacting hydrogen iodide with a molecular oxygen-containing gas in the presence of at least one alkane sulfonic acid, and thereafter recovering the product iodine from the reaction zone.

We have found that the alkane sulfonic acids are excellent, practical catalysts for the reaction of hydrogen iodide with molecular oxygen. The alkane sulfonic acids have been found to be quite stable in mixtures of hydrogen iodide, iodine and water. These acids are soluble in water, are low melting, are strong acids, are not volatile, and are thermally stable up to moderately elevated temperatures. We have found that the alkane sulfonic acids are effective catalysts for the reaction of hydrogen iodide and molecular oxygen.

By the term "alkane sulfonic acids" is meant those compounds having the formula $R—(—SO_3H)_x$, wherein R represents an alkyl group and $x$ represents an integer other than zero. The most suitable of these acids, as a practical matter, are those in which the alkyl group contains up to twenty carbon atoms, those acids in which the alkyl group is a lower alkyl group, for example an alkyl group which contains from one to about six carbon atoms, being preferred. In these acids, the alkyl group may be of straight-chain or of branched-chain configuration. The n-alkane sulfonic acids are preferred. While both the monosulfonic acids ($x=1$) and the polysulfonic acids ($x=2$ or more) are satisfactory as catalysts, the monosulfonic acids are preferred because of their greater stability. The alkane sulfonic acids in which the alkyl group is substituted by one or more substituent groups also are satisfactory as catalysts, provided the substituent group or groups are not of such character that they affect the stability of the acid with respect to hydrogen iodine-water-iodine mixtures. Typical of the suitable alkane sulfonic acid catalysts are: methane sulfonic acid, methane disulfonic acid (methionic acid), ethane sulfonic acid, n-propane sulfonic acid, isopropane sulfonic acid, n-, and secbutanesulfonic acids, n-hexane sulfonic acid, n-decane sulfonic acid, n-hexadecane sulfonic acid, and the various branched-chain isomers of these compounds. Either a single acid or a mixture of two or more acids may be used as the catalyst. The Indoil Chemical Co. markets a mixture of methane-, ethane- and n-propane sulfonic acids under the trade-name "Alkanesulfonic Acid" which is a particularly desirable and convenient catalyst for effecting the oxidation of hydrogen iodide by molecular oxygen. The properties of these commercially available mixtures of lower alkane sulfonic acids are set out in detail in the specific embodiments of the process of this invention set out hereinafter.

The nature of these alkane sulfonic acids, and methods for preparing them are summarized in the "Encyclopedia of Chemical Technology," Kirk-Othmer, Interscience, 1954, in the section of volume 13 appearing at pages 346–353, entitled "Sulfonic Acids," and in the references cited therein.

The new process is effective for converting hydrogen iodide to iodine regardless of the source of the hydrogen iodide. That is to say, pure hydrogen iodide may be used, or the hydrogen iodide may be merely one component of a mixture of compounds. From the standpoint of operating efficiency, it is desirable, of course, that the hydrogen iodide concentration in the reaction zone be as high as economically feasible.

The conversion of hydrogen iodide to iodine may be carried out in the liquid phase or it may be carried out in the vapor phase. Thus, liquid hydrogen iodide may be oxidized to iodine by the new process. In most cases, however, it will be more convenient to dissolve the hydrogen iodide in water in which the alkane sulfonic acid catalyst also is dissolved, and subject this aqueous solution to contact with molecular oxygen according to the new process. The presence of aqueous water does not appear to inhibit the desired reaction significantly. Also, the presence of substantial amounts of iodine in the reaction mixture does not appear to inhibit or limit the desired reaction. However, in some cases, it may be desirable to limit the amount of iodine in the reaction mixture to prevent formation of a separate iodine phase.

The conversion of hydrogen iodide to iodine according to our discovery also may be carried out in vapor phase. Where the hydrogen iodide is but one component of a mixture of gases, the part of the mixture other than hydrogen iodide may be composed of any material or materials which are substantially inert in the reaction zone. Thus, inert diluents, such as nitrogen, helium or other of the inert gaseous elements, carbon dioxide or other inert gaseous inorganic compounds, or the like, may be present. Also, there may be present gaseous organic materials which are not reactive with any one or all of hydrogen iodide, iodine, water, or molecular oxygen in the presence of an alkane sulfonic acid at the temperatures employed. It has been found that the presence of substantial amounts of either or both of water and iodine in the mixture to be treated will not adversely affect the conversion of hydrogen iodide to iodine, despite the fact that it might be expected that, since both compounds appear on the right-hand side of the reaction equation, the presence of either or both of water or iodine might inhibit or limit the desired reaction.

Molecular oxygen from any source may be used. Thus, pure oxygen is suitable, as are mixtures of molecular oxygen with other gases, such as are mixtures of molecular oxygen with other gases, such as commercially pure (95%) oxygen, oxygen-enriched air, or air itself.

Where conversion of the hydrogen iodide is to be effected in the vapor phase, the amount of molecular oxygen charged preferably is at least the amount theoretically required to convert all of the hydrogen iodide present in the reaction zone to iodine. In some cases, it may be convenient and/or desirable to limit the amount of molecular oxygen charged to somewhat less than the theoretical minimum. Generally, however, to insure maximum conversion of the hydrogen iodide, it is desirable that the amount of molecular oxygen fed be moderately in excess of the theoretical minimum. In such cases, the excess of oxygen should amount to at least 10% over that theoretically required, and in most cases it is preferred that at least a 50% excess of oxygen be present in the reaction zone. A large excess of oxygen is not necessary, and in most cases will be found undesirable because uneconomical. Usually, little advantage will accrue from the use of more than about a 500% excess of oxygen, and in most cases it is preferable that the amount of oxygen exceed the amount theoretically required to oxidize all of the hydrogen iodide present by from about 50% to about 350%. When air or other source of molecular oxygen containing an inert diluent gas is used, precaution should be taken to insure that there is a substantial proportion of each of hydrogen iodide and molecular oxygen in the reaction zone.

Where the conversion of hydrogen iodide to iodine is to be effected in the liquid phase, somewhat greater excesses of molecular oxygen may be required than when the conversion is to be carried out in the vapor phase. Thus, it normally will be found necessary, when conducting the reaction in the liquid phase, to maintain at least a 25% excess of molecular oxygen in the reaction zone, and in some cases as much as a 200-fold excess of oxygen will be found desirable. Preferably, the excess of oxygen is at least 50%, but an excess of more than about 100-fold is not often required, for such large excesses provide little advantage over somewhat lesser excesses and are usually uneconomic and present operating difficulties.

When operating in the liquid phase, it is essential to the effective oxidation of hydrogen iodide that there be a substantial partial pressure of molecular oxygen in the reaction zone. Thus, the oxygen partial pressure should be at least 10 p. s. i., and optimum oxidation rates are usually obtained only when the oxygen partial pressure is 20 p. s. i. or more. While much higher oxygen partial pressures—for example, up to 200 p. s. i. or even more—may be used in general, little added advantage results from the use of oxygen partial pressures in excess of about 100 p. s. i.

A primary factor in effecting the reaction between hydrogen iodide and molecular oxygen in the presence of a liquid phase at practical rates is the maintenance of intimate contact between the gas and liquid phases; practical reaction rates can be obtained only when a very high degree of contact between the gas and liquid phases is maintained. Means for obtaining and maintaining intimate contact between gases and liquids are well known in the art. Any of the known methods may be used in the process of the invention. For example, the reaction mixture may be stirred or otherwise thoroughly agitated, or the liquid materials may be passed in countercurrent flow to the gaseous materials in a tower packed with an inert packing or in a tower equipped with devices for insuring intimate gas-liquid contact, including towers equipped with grid trays, bubble plates, rotary disc contactors or the like. We have discovered that the reaction between hydrogen iodide and molecular oxygen proceeds at unexpectedly high rates when an aqueous solution of hydrogen iodide is dispersed in an extremely finely divided form in an atmosphere containing molecular oxygen. Thus, a preferred physical method for effecting the reaction of hydrogen iodide and molecular oxygen in the liquid phase according to the present invention, comprises dissolving the hydrogen iodide and the alkaline sulfonic acid used as catalyst in water and thoroughly dispersing the resulting solution in the form of very small droplets in an atmosphere of molecular oxygen. This method for effecting the oxidation of hydrogen iodide with molecular oxygen is the subject matter of our copending application Serial No. 619,591, filed October 18, 1956.

When the oxidation of hydrogen iodide is to be carried out in the vapor phase, means must be provided for insuring intimate contact between the catalyst, which normally is a liquid, and the gaseous mixture of the molecular oxygen-containing gas and the hydrogen iodide. Thus, the vaporous reaction mixture may be passed in countercurrent flow to the liquid catalyst, or preferably an aqueous solution of the catalyst, in a packed tower, a grid-tray tower, or like equipment designed to insure good contact between gases and liquids. Alternatively, a composite catalyst comprising the alkane sulfonic acid catalyst impregnated upon an inert porous carrier may be used, the gaseous reaction mixture being passed over and/or through a bed of the composite catalyst.

In vapor phase operation, the amount of catalyst used is not critical; in general, it is most convenient to provide a large excess of catalyst in the reaction zone to insure maximum—or the desired extent—of oxidation of the hydrogen iodide. While the alkane sulfonic acids are liquids at ordinary, or moderately elevated, temperatures, and thus may be used in the pure form, it is generally more desirable to employ solutions of the acids in water. The concentration of the acids in such solutions is not critical—in some cases, a rather dilute solution, such as a 10% or 20% by weight solution of the acid in water may be most desirable, while in other cases, a rather concentrated solution, such as a 60% by weight solution of the acid in water may be most desirable.

In aqueous liquid phase operation, it has been found that the rate and extent of the oxidation of hydrogen iodide by molecular oxygen is a function of the hydrogen ion concentration in the aqueous phase, the rate and extent of the oxidation increasing with increasing hydrogen ion concentration. Practically feasible reaction rates are obtained when the hydrogen ion concentration of the solution is 0.1 molar or greater; it is preferred that the hydrogen ion concentration be at least about 0.3 molar. Little, if any, advantage accrues from the use of hydrogen ion concentrations in excess of about 10.0 molar, as compared to somewhat lower concentrations. Optimum oxidation rates are obtained when the hydrogen ion concentration lies within the range of from about 3 molar and about 6 molar.

The conversion of hydrogen iodide to iodine is effected at any temperature above about 50° C.; however, the reaction rate increases significantly with an increase in temperature. When operating in the liquid phase, the maximum temperature is, of course, that of the boiling reaction mixture at the pressure used. It is normally desirable to conduct the reaction at temperatures somewhat lower than that at which the reaction mixture boils, since boiling mixtures do not absorb gases (in this case, molecular oxygen) readily. Preferably, when the reaction is carried out in the liquid phase, the temperature is at least about 80° C. When operating in the vapor phase, the minimum temperature is determined by one of two factors: first, if it is desired that the product iodine be obtained in liquid phase, it will, of course, be necessary to conduct the reaction at a temperature above the melting point of iodine (113.5° C.). Second, if there is present in the reaction zone any material which condenses at a temperature above the melting point of iodine, or if it is desired to recover the product iodine as a solid and there is present in the reaction zone any material which condenses at any temperature above about 50° C., then the dewpoint of the material which will so condense fixes the minimum reaction temperature. From the standpoint of the reaction of hydrogen iodide with oxygen to form iodine, per se, there is no maximum limit on the temperature at which the reaction may be conducted. However, alkane sulfonic acids become somewhat unstable at higher temperatures, so that the chosen reaction temperature should not be so high that the alkane sulfonic acid selected as catalyst will decompose to an undue extent. Temperatures in excess of 200° C. are seldom of much advantage over lower temperatures, and more than adequate reaction rates are obtained at somewhat lower temperatures—for example, at temperatures of 160° C., or less.

The conversion of hydrogen iodide to iodine can be carried out at any convenient pressure. When the conversion is carried out in liquid phase, the minimum pressure which can be used normally will be determined by the molecular oxygen partial pressure desired. If pure oxygen is used, then the system pressure will normally not be substantially greater than the oxygen pressure used. If air, or other mixture of oxygen with an inert gas is used, then the system pressure will be correspondingly greater to furnish the requisite oxygen partial pressure. In some cases, use of elevated pressures may be desirable to reduce the volume of gases handled and/or to increase the boiling temperature of the hydrogen iodide solution in the reaction zone. Pressures in excess of about 500 p. s. i. g. will seldom be found advantageous or desirable, as compared to somewhat lower pressures. The conversion of hydrogen iodide to iodine in the vapor phase may be carried out at any pressure. Operation at substantially atmospheric pressure is quite practical, and in a great many cases will be found to be the most convenient operating pressure. Few, if any, substantial advantages are obtained by operating at reduced pressures, but in many cases it will be found both convenient and desirable to conduct the reaction at moderately elevated pressures. For example, pressures of up to about 500 p. s. i. g. may be used to reduce the volume of gases handled.

At the temperatures set out above, practically feasible hydrogen iodide conversion levels are obtained in a few minutes. For example, when operating in the liquid phase, at temperatures of from about 80° C. to 105° C., spraying the aqueous solution of hydrogen iodide and catalyst into an atmosphere containing molecular oxygen, hydrogen iodide conversion levels of 70% or greater are obtained in a few seconds reaction time. When operating in the vapor phase, at temperatures of from about 80° C. to 150° C., similar conversion levels are obtained in similar reaction times.

Recovery of the product iodine from the effluent from the reaction zone may be effected by known methods, the method used depending upon whether the conversion of hydrogen iodide to iodine was effected in the liquid phase or in the vapor phase, upon the extent to which the hydrogen iodide was converted to iodine and upon the nature of the components of the effluent, if any, other than iodine, water and hydrogen iodide. If the conversion of hydrogen iodide to iodine is substantially 100%, and the conversion of hydrogen iodide was effected in aqueous liquid phase, the product iodine is immiscible with the aqueous phase and the two phases may be separated by decantation where the iodine is liquid, or by filtration, centrifuging or the like, where the iodine is solid. If the conversion of hydrogen iodide to iodine is substantially 100%, and the conversion of the hydrogen iodide was effected in the vapor phase, the iodine may be recovered most simply by cooling the effluent vapors to form liquid water and liquid or solid iodine, from which the iodine is recovered by phase separation as where the hydrogen iodide conversion was carried out in aqueous liquid phase. Where the conversion of the hydrogen iodide is incomplete, the effluent will contain both iodine and hydrogen iodide. Where the conversion of hydrogen iodide was carried out in the aqueous liquid phase, or in the aqueous liquid phase resulting from condensation of the effluent vapors from vapor phase operation, the hydrogen iodide, and to a certain extent the iodine, will be dissolved in the aqueous phase. In many cases, it will be found possible to so control the degree of hydrogen iodide conversion and the amount of water present in the effluent so that the amount of iodine formed exceeds substantially the amount of iodine which will dissolve in the hydrogen iodide solution obtained from the effluent. This permits direct removal of a substantial part of the product iodine by simple phase separation. The iodine dissolved in the hydrogen iodide solution may be recovered by treating the solution with a strong oxidizing agent, such as chlorine, to convert the remaining hydrogen iodide to iodine, and separating the iodine from the solution by simple phase separation. Alternatively, the iodine dissolved in the hydrogen iodide solution may be recovered by passing an inert gas through the solution and recovering iodine from the effluent gases. This method for selectively removing iodine from mixtures of iodine, hydrogen iodide and water is disclosed and claimed in copending application Serial No. 594,893, filed June 29, 1956. Where the oxidation of hydrogen iodide is conducted in the liquid phase, this method may be used to advantage to recover iodine directly from the reaction mixture. Thus, it will be found that if a part of the molecular oxygen-containing gas is removed from the reaction zone, the gas will contain iodine and water vapor, but no hydrogen iodide. Recovery of the iodine content of such mixtures of iodine and water is effected by the methods already set out herein. In some cases, it may be found most convenient and desirable to simply separate the iodine phase from the aqueous phase, and recycle the aqueous phase, containing water, hydrogen iodide, iodine and the catalyst to the reaction zone.

This constitutes a general description of the process of the invention; the following examples illustrate specific applications of this process. It is to be understood that these examples are for the purpose of illustration only and that the invention is not to be regarded as limited in any way to the specific conditions cited therein. In these examples, parts by weight bear the same relation to parts by volume as the kilogram bears to the liter.

Example I 20 parts by volume of a 15% by weight solution of hydrogen iodide in water and 2 parts by volume of Alkanesulfonic Acid were charged to a reactor fitted with a stirrer. The mixture was heated to 105° C., and while maintained at this temperature and constantly thoroughly stirred, was intimately mixed with pure molecular oxygen, the oxygen pressure being 60 p. s. i. g. At the end of 30 minutes, the reaction was terminated. Analysis of the reaction mixture showed that 76.8% of the hydrogen iodide had been converted to iodine.

The Alkanesulfonic Acid used as catalyst is a commercial product of the Indoil Chemical Co. It is a mixture of methane-, ethane- and n-propanesulfonic acids having an average molecular weight of 110. The commercial product has the following composition: Sulfonic acids—94% w.; water—5% w.; sulfuric acid—1% w.; ash—0.01% w. Other properties of this commercial product are summarized in Bulletin No. 11, Indoil Chemical Co., entitled "Alkanesulfonic Acid," issued in 1952.

Example II 20 parts by volume of a 20% by weight solution of hydrogen iodide in water and 2 parts by volume of the Alkanesulfonic Acid described in Example I were charged to a reactor and reacted with pure molecular oxygen under the conditions set out in Example I for 10 minutes. 81.6% of the hydrogen iodide was converted to iodine.

Example III 9.82 parts by weight of iodine, 20 parts by volume of a 20% by weight solution of hydrogen iodide in water and 2 parts by volume of the Alkanesulfonic Acid described in Example I were reacted with pure molecular oxygen under the conditions set out in Example I for 90 minutes. 73% of the hydrogen iodide was converted to iodine.

Example IV 1.31 parts by weight of potassium iodide and 20 parts by volume of a solution of 20 parts by volume of the Alkanesulfonic Acid described in Example I in 100 parts by volume of water was oxidized with pure molecular oxygen (60 p. s. i. g.) at 105° C. for 40 minutes. Conversion of hydrogen iodide to iodine was 93%.

Example V

The experiment of Example IV was repeated three additional times, in each, the amount of potassium iodide being increased, all other conditions excepting the reaction time remaining the same. The following results were obtained:

| Amount of KI charged (parts by weight) | Reaction time (minutes) | Percent conversion of HI to $I_2$ |
|---|---|---|
| 2.62 | 50 | 79.5 |
| 3.93 | 30 | 88.3 |
| 5.30 | 45 | 91.5 |

Example VI

A solution of hydrogen iodide in water, containing 27.5% by weight hydrogen iodide, was mixed with 2% by weight of that solution of the Alkanesulfonic Acid described in Example I. The solution was fed to a gas atomizing nozzle, wherein it was dispersed into small droplets by a stream of molecular oxygen, and the dispersion of the oxygen in the solution was passed into a vertical free-space reactor in which there was maintained a pressure of 60 p. s. i. g. oxygen. There oxygen-to-hydrogen iodide mole ratio was 55.5. The reactor was maintained at a temperature of 111° C. The dispersed liquid was maintained in the reactor for 2.1 seconds and then was withdrawn and analyzed for its free iodine content. It was found that 74% of the hydrogen iodide had been converted to iodine.

The experiment was repeated seven more times, at varying reaction temperatures and residence times. The reaction temperatures and residence times used and conversions obtained were as follows:

| Run | Temperature (° C.) | Residence time (seconds) | Conversion (percent) |
|---|---|---|---|
| 2 | 119 | 2.4 | 80 |
| 3 | 115 | 4.7 | 93 |
| 4 | 119 | 7.2 | 93 |
| 5 | 114 | 9.0 | 91 |
| 6 | 119 | 8.7 | 93 |
| 7 | 123 | 4.7 | 91 |
| 8 | 123 | 12.2 | 92 |

While the process of this invention is applicable to effect the oxidation of hydrogen iodide from any source, the process is of primary interest for recovering elemental iodine from the effluents of processes which employ iodine as a reactant to remove hydrogen atoms from organic materials, thus changing the carbon-to-carbon structures of such materials. In such processes, since one mole of hydrogen iodide is formed per hydrogen atom removed, the effluent vapors contain large amounts of hydrogen iodide. Also, in many cases, the product of the dehydrogenation is quite reactive with hydrogen iodide and/or iodine at the reaction temperatures, and to prevent undesirable side-reactions it is necessary to substantially reduce the temperature of the effluent gases immediately on their emergence from the reactor, and/or to dilute those gases substantially. Such quenching and/or dilution often is most conveniently accomplished by quenching the effluent gases with water, or by adding steam to the effluent gases; in these cases, the source of hydrogen iodide also contains water. Since iodine is expensive, it must be recovered from such effluent streams. The process of the invention is admirably suited to recovery of iodine from hydrogen iodide contained in the effluent streams from such processes, for it effects the oxidation of hydrogen iodide directly from such effluent streams. Further, the process of the invention is eminently suited for the conversion of large amounts of hydrogen iodide, for it employs a very cheap widely available oxidizing agent (oxygen) and an inexpensive, widely available catalyst, is operationally quite simple and effects a high degree of conversion of hydrogen iodide under practically feasible conditions.

In some cases, it may be found desirable to conduct the oxidation of hydrogen iodide in two or more consecutive stages, employing the process of this invention in each of the stages. In some cases, it will be found desirable to remove the product iodine formed in each stage, the iodine-free effluent being passed to the next stage. Also, it may be found desirable to increase the concentration of hydrogen iodide in the effluent of one stage before that effluent is passed to the next stage. Such reconcentration of the effluent can be conveniently effected by fractionation of the liquid effluent to remove water overhead. It will be appreciated that these, and other modes of applying the principle of the invention, may be employed, and obviously many modifications and variations of the invention, as hereinbefore set forth, may be made without departing from the spirit and scope of the invention, as disclosed hereinbefore and as defined in the hereto appended claims.

We claim as our invention:

1. A process for oxidizing hydrogen iodide to iodine which comprises reacting hydrogen iodide with molecular oxygen in the presence of at least one alkane sulfonic acid having up to 20 carbon atoms per molecule as catalyst, and recovering iodine from the resulting reaction mixture.

2. A process for oxidizing hydrogen iodide to iodine which comprises reacting hydrogen iodide with molecular oxygen at a temperature of from about 50° C. to about 200° C. in the presence of at least one alkane sulfonic acid having up to 20 carbon atoms per molecule as catalyst, and recovering iodine from the resulting reaction mixture.

3. A process for oxidizing hydrogen iodide to iodine which comprises reacting hydrogen iodide with molecular oxygen at a temperature of from about 50° C. to about 200° C. in the presence of at least one lower alkane sulfonic acid as catalyst, the amount of said molecular oxygen being at least the amount theoretically required to oxidize all of said hydrogen iodide to iodine, and recovering iodine from the resulting reaction mixture.

4. A process for oxidizing hydrogen iodide to iodine which comprises intimately contacting a mixture comprising gaseous hydrogen iodide and a molecular oxygen-containing gas with at least one alkane sulfonic acid containing up to 20 carbon atoms per molecule as catalyst and recovering iodine from the effluent gases.

5. The process of claim 4 wherein the catalyst is at least one lower alkane sulfonic acid.

6. A process for oxidizing hydrogen iodide to iodine which comprises intimately contacting at a temperature of from about 50° C. to about 200° C. a mixture comprising gaseous hydrogen iodide and a molecular oxygen-containing gas with at least one alkane sulfonic acid containing up to 7 carbon atoms per molecule as catalyst, the amount of said molecular oxygen-containing gas being sufficient to provide at least 10% excess over the theoretical amount of molecular oxygen required to oxidize all of said hydrogen iodide to iodine, and recovering iodine from the effluent gases.

7. A process for oxidizing hydrogen iodide to iodine which comprises intimately contacting a liquid aqueous solution of hydrogen iodide with a molecular oxygen-containing gas in the presence of at least one alkane sulfonic acid containing up to 20 carbon atoms per molecule as catalyst and recovering iodine from the resulting reaction mixture.

8. A process for oxidizing hydrogen iodide to iodine which comprises intimately contacting at a temperature of at least 50° C. a liquid mixture comprising hydrogen iodide and water with a molecular oxygen-containing gas in the presence of at least one alkane sulfonic acid having up to 20 carbon atoms per molecule as catalyst and recovering iodine from the effluent gases, the partial pressure of molecular oxygen in the reaction zone being at least 10 pounds per square inch.

9. A process for oxidizing hydrogen iodide to iodine which comprises intimately contacting at a temperature of at least 50° C. a liquid mixture comprising hydrogen iodide and water with a molecular oxygen-containing gas in the presence of at least one alkane sulfonic acid having up to 20 carbon atoms per molecule as catalyst and recovering iodine from the effluent gases, the amount of such catalyst being sufficient to provide in the reaction mixture a hydrogen ion concentration of at least 0.1 molar.

10. A process for oxidizing hydrogen iodide to iodine which comprises intimately contacting a liquid aqueous solution of hydrogen iodide with a molecular oxygen-containing gas in the presence of at least one lower alkane sulfonic acid as catalyst at a temperature of at least about 50° C., the partial pressure of molecular oxygen in the reaction zone being at least 10 pounds per square inch, and the amount of said catalyst being sufficient to provide in the reaction mixture a hydrogen ion concentration of at least 0.1 molar.

11. A process for oxidizing hydrogen iodide to iodine which comprises intimately contacting a liquid aqueous solution of hydrogen iodide with a molecular oxygen-containing gas in the presence of at least one lower alkane sulfonic acid as catalyst at a temperature of at least about 50° C. and recovering iodine from the resulting reaction mixture.

12. A process for oxidizing hydrogen iodide to iodine which comprises intimately contacting a liquid aqueous solution of hydrogen iodide with a molecular oxygen-containing gas in the presence of at least one lower alkane sulfonic acid as catalyst at a temperature of at least about 50° C., the partial pressure of molecular oxygen in the reaction zone being at least 10 pounds per square inch, the amount of molecular oxygen being at least 50% in excess of the amount theoretically required to convert all of said hydrogen iodide to iodine, and the amount of said catalyst being sufficient to provide in the reaction mixture a hydrogen ion concentration of at least 0.3 molar.

13. The process according to claim 12 wherein the amount of the catalyst is sufficient to provide a hydrogen ion concentration in the reaction mixture of from about 3 to about 6 molar.

References Cited in the file of this patent

Mellor: "Comprehensive Treatise on Inorganic and Theoretical Chemistry," Supp. II, Part I, Longmans, Green and Co., New York, 1956, pages 865–66.

Kirk-Othmer: Encyclopedia of Chemical Technology, vol. 13, Interscience Encyclopedia, Inc., N. Y., 1954, pages 346 and 352.